United States Patent
Torigoe et al.

(10) Patent No.: US 10,150,707 B2
(45) Date of Patent: Dec. 11, 2018

(54) METHOD OF PRODUCING THERMAL SPRAY POWDER, MANUFACTURE APPARATUS OF THERMAL SPRAY POWDER, AND THERMAL SPRAY POWDER PRODUCED BY THE PRODUCING METHOD

(71) Applicant: MITSUBISHI HITACHI POWER SYSTEMS, LTD., Kanagawa (JP)

(72) Inventors: Taiji Torigoe, Tokyo (JP); Ichiro Nagano, Tokyo (JP); Yoshifumi Okajima, Tokyo (JP); Ikuo Okada, Tokyo (JP); Masahiko Mega, Tokyo (JP); Yoshitaka Uemura, Kanagawa (JP); Naotoshi Okaya, Kanagawa (JP); Shusuke Sakuma, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 0 days.

(21) Appl. No.: 15/329,696

(22) PCT Filed: Aug. 25, 2015

(86) PCT No.: PCT/JP2015/073898
§ 371 (c)(1),
(2) Date: Jan. 27, 2017

(87) PCT Pub. No.: WO2016/035618
PCT Pub. Date: Mar. 10, 2016

(65) Prior Publication Data
US 2017/0260101 A1    Sep. 14, 2017

(30) Foreign Application Priority Data
Sep. 5, 2014   (JP) .................................. 2014-180794

(51) Int. Cl.
*C04B 35/48* (2006.01)
*C04B 35/488* (2006.01)
(Continued)

(52) U.S. Cl.
CPC .............. *C04B 35/488* (2013.01); *B05B 7/22* (2013.01); *B05B 7/228* (2013.01);
(Continued)

(58) Field of Classification Search
CPC ..... C04B 35/48; C04B 35/482; C04B 35/484; C04B 35/486; C04B 35/488
See application file for complete search history.

(56) References Cited

U.S. PATENT DOCUMENTS 3,175,919 A * 3/1965 Smoot .................... C04B 35/48
501/103
5,466,208 A   11/1995 Jackson et al.
(Continued)

FOREIGN PATENT DOCUMENTS

| CN | 1086234 | 5/1994 |
|---|---|---|
| CN | 1414216 | 4/2003 |

(Continued)

OTHER PUBLICATIONS

International Search Report dated Oct. 20, 2015 in International (PCT) Application No. PCT/JP2015/073898.
(Continued)

*Primary Examiner* — Noah S Wiese
(74) *Attorney, Agent, or Firm* — Wenderoth, Lind & Ponack, L.L.P.

(57) ABSTRACT

A method for producing a thermal spray powder includes: a preparing step of preparing a powder mixture containing a first particle made from zirconia-based ceramic containing a first additive agent and a second particle made from zirconia-based ceramic containing a second additive agent, the
(Continued)

powder mixture having a 10% cumulative particle diameter of more than 0 μm and not more than 10 μm; and a secondary-particle producing step of producing a plurality of secondary particles each of which includes the first particle and the second particle sintered with each other.

18 Claims, 10 Drawing Sheets

(51) Int. Cl.

| | | |
|---|---|---|
| *B05B 7/22* | (2006.01) | |
| *F01D 9/02* | (2006.01) | |
| *C23C 4/11* | (2016.01) | |
| *C04B 35/626* | (2006.01) | |
| *C04B 35/63* | (2006.01) | |
| *C09D 1/00* | (2006.01) | |
| *C09D 5/03* | (2006.01) | |
| *F01D 5/28* | (2006.01) | |
| *C23C 2/00* | (2006.01) | |
| *C23C 28/00* | (2006.01) | |
| *C23C 4/073* | (2016.01) | |
| *B22F 1/00* | (2006.01) | |

(52) U.S. Cl.
CPC .... *C04B 35/6261* (2013.01); *C04B 35/62655* (2013.01); *C04B 35/6303* (2013.01); *C09D 1/00* (2013.01); *C09D 5/031* (2013.01); *C09D 5/036* (2013.01); *C23C 2/003* (2013.01); *C23C 4/073* (2016.01); *C23C 4/11* (2016.01); *C23C 28/3215* (2013.01); *C23C 28/3455* (2013.01); *F01D 5/288* (2013.01); *F01D 9/02* (2013.01); *B22F 1/00* (2013.01); *C04B 2235/3224* (2013.01); *C04B 2235/3225* (2013.01); *C04B 2235/3246* (2013.01); *C04B 2235/95* (2013.01); *F05D 2220/32* (2013.01); *F05D 2230/31* (2013.01); *F05D 2240/35* (2013.01); *F05D 2300/21* (2013.01); *F05D 2300/2118* (2013.01)

(56) References Cited

U.S. PATENT DOCUMENTS

| 6,916,551 B2 | 7/2005 | Torigoe et al. |
|---|---|---|
| 7,462,393 B2 | 12/2008 | Damani et al. |
| 8,399,372 B2 * | 3/2013 | Chun .................... C04B 35/488 422/240 |
| 8,758,858 B2 | 6/2014 | Sun et al. |
| 9,822,437 B2 | 11/2017 | Torigoe et al. |
| 2011/0262770 A1 | 10/2011 | Torigoe et al. |

FOREIGN PATENT DOCUMENTS

| CN | 1502663 | 6/2004 |
|---|---|---|
| CN | 101723667 | 6/2010 |
| CN | 101903558 | 12/2010 |
| CN | 102187013 | 9/2011 |
| CN | 102471863 | 5/2012 |
| JP | 61-41757 | 2/1986 |
| JP | 9-287065 | 11/1997 |
| JP | 2001-348655 | 12/2001 |
| JP | 2002-69607 | 3/2002 |
| JP | 2003-129210 | 5/2003 |
| JP | 2003-160852 | 6/2003 |
| JP | 2006-200005 | 8/2006 |
| JP | 3859968 | 12/2006 |
| JP | 2007-270245 | 10/2007 |
| JP | 4388466 | 12/2009 |
| JP | 4533719 | 9/2010 |
| JP | 2011-63018 | 3/2011 |
| JP | 2012-17486 | 1/2012 |
| JP | 5602156 | 10/2014 |
| WO | 2010/053687 | 5/2010 |

OTHER PUBLICATIONS

Office Action dated Jul. 29, 2016 in corresponding Taiwanese Application No. 104128819, with English translation.
Li, Wei-Cheng, et al., "Thermal spray process and application of nanostructured materials", Industrial Materials, vol. 153, Aug. 1999, cited in CB
Zhou, Hong-Ming, et. al., "Research Status and Development Tendency of Thermal Barrier Coatings", School of Materials Science and Engineering, Central South University, Changsha, Materials Review, vol. 20, No. 3, Mar. 2006, with English abstract and cited in CB.
International Preliminary Report on Patentability dated Mar. 16, 2017 in corresponding International (PCT) Application No. PCT/JP2015/073898, with English translation.
Notification of Reason for Refusal dated Apr. 10, 2018 in Korean Patent Application No. 2017-7002340, with Machine Translation.
Notification of Reason for Refusal dated Feb. 6, 2018 in Korean Application No. 10-2017-7002340, with English translation.
Office Action dated Aug. 2, 2018 in corresponding Chinese Application No. 201580040757.6, with English translation.

* cited by examiner

COOLANT GAS

METHOD OF PRODUCING THERMAL
SPRAY POWDER, MANUFACTURE
APPARATUS OF THERMAL SPRAY
POWDER, AND THERMAL SPRAY POWDER
PRODUCED BY THE PRODUCING METHOD

TECHNICAL FIELD

The present disclosure relates to a method of producing a thermal spray powder, a manufacture apparatus of a thermal spray powder, a thermal spray powder produced by the producing method, a high-temperature component covered with a thermal barrier coating, and a gas turbine including the high-temperature component.

BACKGROUND ART

Techniques have been developed to improve thermal efficiency of thermal power generation as a measure for saving energy. To improve thermal efficiency of a gas turbine for power generation, it is effective to increase an inlet temperature of gas.

To increase an inlet temperature of gas, it is necessary to form stationary vanes, rotor blades, wall parts of a combustor, and the like of a gas turbine from heat-resistant members. Stationary vanes and rotor blades are made from heat-resistant metal but cannot bear such an elevated temperature, and thus thermal barrier coating (TBC) is formed on a substrate made from heat-resistant metal.

Thermal barrier coating includes a metallic bond layer and a ceramic layer applied in series on a substrate. A ceramic layer is formed on a metallic bond layer by thermal spraying, and is often made from a $ZrO_2$-based material, yttria-stabilized zirconia (YSZ) in particular, which is a $ZrO_2$ partially or fully stabilized by addition of $Y_2O_3$, for YSZ has a relatively low thermal conductivity and a relatively high thermal expansion rate among ceramic materials.

In recently developed gas turbines, an inlet temperature of gas gets higher than 1600° C. If rotor blades and stationary vanes are coated with thermal barrier coating including a ceramic layer formed from YSZ, there is a risk of separation of a part of the ceramic layer during operation of a gas turbine under a harsh operational condition of a temperature exceeding 1600° C., which may deteriorate thermal resistant property.

Furthermore, gas turbines having an even higher thermal efficiency have been developed in recent years, and in some of them an inlet temperature of gas of gets as high as 1700° C. In this case, the surface temperature of stationary vanes and rotor blades is assumed to increase to 1300° C. Thus, thermal barrier coating is required to have a thermal resistance and a barrier property improved even further.

Separation of a ceramic layer made from YSZ is due to insufficient crystallization stability of YSZ under a high-temperature environment, as well as insufficient durability of YSZ against a great thermal stress. In view of this, ceramic layers having an excellent crystallization stability under a high-temperature environment and a high thermal durability have been developed, including $Yb_2O_3+ZrO_2$ (Patent Document 1), $Dy_2O_3+ZrO_2$ (Patent Document 2), $Er_2O_3+ZrO_2$ (Patent Document 3), and $SmYbZr_2O_7$ (Patent Document 4).

On the other hand, ceramic powders used as a material of ceramic layers are expensive, and it is desirable to reduce costs for producing ceramic layers.

In view of this, Patent Document 5 discloses a method of reusing particles of a ceramic spray powder that remain unattached to an object after being sprayed to the object. The reusing method includes a non-adhering powder recovery step of recovering particles including a ceramic spraying powder that remain unattached to an object as a recovered powder, a separating step of separating the recovered powder into a metal recovered powder including a metal spray powder and a ceramic recovered powder including a ceramic spray powder by classification, for instance, and a spray-powder reusing step of spraying the ceramic recovered powder obtained in the separating step to another object as a thermal spray powder.

Typically, a ceramic spray powder that remains unattached to an object has been discarded, but according to the reusing method disclosed in Patent Document 5, a ceramic spray powder that remains unattached to an object is reused, and thereby the amount of ceramic spray powder to be discarded decreases. As a result, it is possible to reduce the amount of a fresh ceramic spray powder to be purchased additionally, which reduces the total production cost for forming ceramic layers, in spite of additional costs required to reuse the ceramic spraying powder.

CITATION LIST

Patent Literature

Patent Document 1: JP2003-160852A
Patent Document 2: JP2001-348655A
Patent Document 3: JP2003-129210A
Patent Document 4: JP2007-270245A
Patent Document 5: JP2012-17486A

SUMMARY

Problems to be Solved

As described above, there are several kinds of rare-earth oxide that can be added to $ZrO_2$ as a stabilizer. Thus, a recovered powder recovered in a spraying facility may include more than one kind of ceramic powder.

For example, a recovered powder may contain YSZ and $Yb_2O_3+ZrO_2$ (hereinafter, also referred to as YbSZ). YSZ and YbSZ have similar densities and thus are difficult to be separated, and would be contained in a ceramic spray powder for reuse even though the reusing method disclosed in Patent Document 5 is applied.

According to Patent Document 1, a ceramic layer containing YbSZ has a high thermal resistant property and a thermal barrier property. Thus, the present inventors had expected to obtain a ceramic layer having a high thermal resistant property and a high thermal barrier property as well from a ceramic spray powder containing both YSZ and YbSZ.

However, when the present inventors actually formed and evaluated a ceramic layer made from a ceramic spray powder containing a mixture of YSZ and YbSZ recovered by the reusing method disclosed in Patent Document 5, it was found that the thermal cycle property of the ceramic layer is lower than that of a typical ceramic layer made from YSZ. Accordingly, it was made clear that the reusing method of Patent Document 5 needs to be modified if a recovered powder includes different kinds of rare-earth oxide as additive agents.

In view of the above issue, at least one embodiment of the present invention is to provide a method of producing a thermal spray powder, a manufacture apparatus of a thermal spray powder, a thermal spray powder, a high-temperature component coated with thermal barrier coating, and a gas turbine including the high-temperature component, whereby it is possible to obtain a ceramic layer having an excellent thermal cycle property from a material that contains a mixture of different kinds of rare-earth oxide as additive agents.

Solution to the Problems

The present inventors conducted various researches to achieve the above object, and found that, if a ceramic layer is formed from a recovered powder containing different kinds of rare-earth oxide as additive agents mixed therein, zirconia-based ceramic particles containing different kinds of rare-earth oxide do not get mixed sufficiently but form a relatively large chunk of zirconia-based ceramic including a particular rare-earth oxide, so that cracks are likely to form or develop at a boundary of such a chunk. Furthermore, the present inventors found that, even in a case where different kinds of rare-earth oxide are contained in a material as additive agents, dispersing zirconia-based ceramic particles finely at the stage of spraying suppresses generation of a large chunk of zirconia-based ceramic containing a particular rare-earth oxide in a ceramic layer to be produced, and eventually suppresses generation and development of cracks at a boundary of a chunk, thus arriving at the present invention.

(1) A method for producing a thermal spray powder, according to at least one embodiment, comprises: a preparing step of preparing a powder mixture containing a first particle made from zirconia-based ceramic containing a first additive agent and a second particle made from zirconia-based ceramic containing a second additive agent, the powder mixture having a 10% cumulative particle diameter of more than 0 μm and not more than 10 μm; and a secondary-particle producing step of producing a plurality of secondary particles each of which includes the first particle and the second particle sintered with each other.

With the above configuration (1), each of the plurality of first particles and the plurality of second particles contained in the powder mixture has a 10% cumulative particle diameter of greater than 0 μm and not greater than 10 μm, and thus each secondary particle contains a mixture of the first particle and the second particle in an even more finely-dispersed form. Thus, in a ceramic layer obtained by spraying the secondary particles, it is possible to suppress generation of a large chunk of zirconia-based ceramic containing only one of the first additive agent or the second additive agent. As a result, generation and development of cracks on the boundary of a chunk are suppressed, and thereby it is possible to obtain a ceramic layer having an excellent thermal cycle property.

(2) In some embodiments, in the above configuration (1), the first additive agent is yttrium oxide, and the second additive agent is ytterbium oxide.

A ceramic layer made from zirconia-based ceramic containing ytterbium oxide, i.e., YbSZ, has a better thermal resistant property than a ceramic layer made from YSZ. On the other hand, in a ceramic layer obtained by spraying a powder mixture containing YbSZ particles and YSZ particles, there is a risk of generation of a relatively large chunk of YbSZ, which may lead to generation or development of cracks on the boundary of the chunk.

In this regard, according to the above method (2), each secondary particle includes a mixture of YbSZ particles and YSZ particles finely dispersed. Thus, in a ceramic layer obtained by spraying the secondary particles, it is possible to suppress generation of a large chunk of YbSZ. As a result, generation and development of cracks on the boundary of a chunk are suppressed, and thereby it is possible to obtain a ceramic layer having an excellent thermal cycle property.

(3) In some embodiments, in the above configuration (1) or (2), the powder mixture has a 10% cumulative particle diameter of not more than 5 μm.

With the above configuration (3), each of the plurality of first particles and the plurality of second particles has a 10% cumulative particle diameter of not greater than 5 μm, and thus each secondary particle contains a mixture of the first particles and the second particles in an even more finely dispersed form.

(4) In some embodiments, in any one of the above configurations (1) to (3), the secondary-particle producing step includes: a powder agglomeration step of producing a plurality of intermediate particles each containing the first particle and the second particle by a spray dry method, and a heat treatment step of performing heat treatment on the intermediate particles to obtain the secondary particles.

With the above configuration (4), by the spray dry method, intermediate particles can be easily produced to have a spherical shape, and as a result, it is possible to easily obtain the secondary particles having a spherical shape. The secondary particles having a sphere shape can be easily carried, and thus are suitable for thermal spraying.

(5) In some embodiments, in any one of the above configurations (1) to (4), the method of producing a thermal spray powder further comprises a secondary-particle classifying step of obtaining a powder having a 10% cumulative particle diameter of not less than 20 μm and not more than 150 μm from the secondary particles obtained in the secondary-particle producing step.

With the above configuration (5), a powder of the secondary particles has a 10% cumulative particle diameter of at least 20 μm, and thereby it is possible to produce a ceramic layer having a suitable porosity and thus a good thermal barrier property. Also, the powder of the second particles for thermal spraying has a 10% cumulative particle diameter of not more than 150 μm, and thereby an appropriate layer-forming efficiency is achieved, which makes it possible to form a ceramic layer in a relatively short time.

(6) In some embodiments, in any one of the above configurations (1) to (5), the preparing step includes: a non-adhering particle recovery step of recovering a plurality of first non-adhering particles which remain unattached to a spray target after spraying a plurality of particles made from zirconia-based ceramic containing the first additive agent, and a plurality of second non-adhering particles which remain unattached to a spray target after spraying a plurality of particles made from zirconia-based ceramic containing the second additive agent; and a powder crushing step of crushing the plurality of first non-adhering particles and the plurality of second non-adhering particles collectively.

In the above configuration (6), each of the secondary particles produced from the recovered first and second non-adhering particles includes a finely dispersed mixture of zirconia-based ceramic particles containing the first additive agent and zirconia-based ceramic particles containing the second additive agent. Thus, in a ceramic layer obtained by spraying a powder containing the secondary particles, it is possible to suppress generation of a large chunk of zirconia-based ceramic containing the first additive agent or zirconia-based ceramic containing the second additive agent. As a result, generation and development of cracks on the boundary of a chunk are suppressed, and thereby it is possible to obtain a ceramic layer having an excellent thermal cycle property.

Furthermore, the secondary particles are produced from the recovered first non-adhering particles and second non-adhering particles, and thus the above method (6) of producing a thermal spray powder can also be a method of regenerating a thermal spray powder. Thus, with the above configuration (6), it is possible to reduce the amount of first non-adhering particles and second non-adhering particles to be discarded, to reduce the used amount of a raw-material powder required to produce a ceramic layer per unit volume, and to reduce costs for producing a ceramic layer.

Furthermore, in this configuration (6), the recovered first non-adhering particles and second non-adhering particles are crushed collectively, and thus it is unnecessary to recover the first non-adhering particles and the second non-adhering particles separately. Thus, it is possible to recover the first non-adhering particles and the second non-adhering particles efficiently, which also contributes to reduction of costs for producing a ceramic layer.

(7) In some embodiments, in the above configuration (6), in the non-adhering particle recovery step, a plurality of third non-adhering particles which remain unattached to a spray target after spraying a plurality of particles made from metal is recovered along with the plurality of first non-adhering particles and the plurality of second non-adhering particles. The method further comprises a selecting step of separating the plurality of third non-adhering particles from the plurality of first non-adhering particles and the second non-adhering particles.

With the above configuration (7), even in a case where the third non-adhering particles made from metal are collected together with the first and second non-adhering particles, the third non-adhering particles are separated from the plurality of first non-adhering particles and the second non-adhering particles in the selecting step. Thus, it is possible to prevent metal from being included in a thermal spray powder to be produced.

(8) In some embodiments, in the above configuration (6) or (7), the method further comprises a secondary-particle classifying step of obtaining a powder having a 10% cumulative particle diameter of not less than 20 μm and not more than 150 μm from the secondary particles obtained in the secondary-particle producing step. The preparing step further includes an irregular-particle recovery step of recovering irregular particles excluded in the secondary-particle classifying step. In the powder crushing step, the plurality of first non-adhering particles, the plurality of second non-adhering particles, and the irregular particles are crushed collectively.

With the above configuration (8), the irregular particles are collectively crushed along with the plurality of first non-adhering particles and the plurality of second non-adhering particles, and thereby it is possible to make use of the irregular particles, thus resulting in an increase of a regeneration amount of the thermal powder spray. Accordingly, it is possible to further reduce the used amount of a raw-material powder of zirconia-based ceramic required to produce a ceramic layer per unit volume, and to further reduce costs for producing a ceramic layer.

(9) In some embodiments, in any one of the above configurations (6) to (8), in the non-adhering particle recovery step, the plurality of first non-adhering particles and the plurality of second non-adhering particles are recovered by a dust collector.

With the above configuration (9), using a dust collector makes it possible to recover the first non-adhering particles and the second non-adhering particles efficiently.

(10) A manufacture apparatus for a thermal spray powder, according to at least one embodiment of the present invention, comprises: a dust collector capable of recovering non-adhering particles that remain unattached to a spray target from among a plurality of particles made from zirconia-based ceramic sprayed from a spraying device; a power crushing device (crusher) capable of crushing the non-adhering particles recovered by the dust collector; and a secondary-particle producing device capable of producing secondary particles from a powder of the non-adhering particles obtained by the power crushing device.

With the above configuration (10), the power crushing device crushes non-adhering particles, and thereby the secondary particles produced from zirconia ceramic containing different additive agents contains a mixture of finely-dispersed zirconia-based ceramic particles containing different additive agents. Thus, in a ceramic layer obtained by spraying a powder containing the secondary particles, it is possible to suppress generation of a large chunk of zirconia-based ceramic particles containing a particular additive agent. As a result, generation and development of cracks on the boundary of a chunk are suppressed, and thereby it is possible to obtain a ceramic layer having an excellent thermal cycle property.

(11) A thermal spray powder according to at least one embodiment of the present invention comprises a plurality of secondary particles each of which includes a first particle and a second particle sintered with each other. The first particle is made from zirconia-based ceramic containing a first additive agent, and the second particle is made from zirconia-based ceramic containing a second additive agent. Each of the first particle and the second particle has a 10% cumulative particle diameter of more than 0 μm and not more than 10 μm.

While the thermal spray powder in the above configuration (11) includes the secondary particles made from zirconia-based ceramic containing different additive agents, the plurality of first particles and the plurality of second particles each has a 10% cumulative particle diameter of greater than 0 μm and not greater than 10 μm, whereby particles of zirconia-based ceramic containing different additive agents are finely dispersed in each secondary particle. Thus, in a ceramic layer obtained by spraying a powder containing the secondary particles, it is possible to suppress generation of a large chunk of zirconia-based ceramic containing a particular additive agent. As a result, generation and development of cracks on the boundary of a chunk are suppressed, and thereby it is possible to obtain a ceramic layer having an excellent thermal cycle property.

(12) A high-temperature component according to at least one embodiment of the present invention comprises: a substrate; and a thermal barrier coating formed on the substrate. The thermal barrier coating comprises a ceramic layer formed by spraying. The ceramic layer is formed by spraying a thermal spray powder. The thermal spray powder comprises a plurality of secondary particles each of which includes a first particle and a second particle sintered with each other. The first particle is made from zirconia-based ceramic containing a first additive agent. The second particle is made from zirconia-based ceramic containing a second additive agent. Each of the first particle and the second particle has a 10% cumulative particle diameter of more than 0 μm and not more than 10 μm.

While the thermal spray powder in the above configuration (12) includes the secondary particles made from zirconia-based ceramic containing different additive agents, the plurality of first particles and the plurality of second particles each has a 10% cumulative particle diameter of greater than 0 μm and not greater than 10 μm, whereby particles of zirconia-based ceramic containing different additive agents are finely dispersed in each secondary particle. Thus, in a ceramic layer obtained by spraying the secondary particles, it is possible to suppress generation of a large chunk of zirconia-based ceramic containing a particular additive agent. As a result, generation and development of cracks on the boundary of a chunk are suppressed, and thereby it is possible to obtain a ceramic layer with an excellent thermal cycle property, which extends the lifetime of a high-temperature component covered with thermal barrier coating including the ceramic layer.

(13) In some embodiments, in the above configuration (12), the thermal spray powder is produced by the method of producing a thermal spray powder according to any one of the above (1) to (9).

With the above configuration (13), the thermal spray powder is produced by the method of producing a thermal spray powder according to any one of the above configurations (1) to (9), and thus the ceramic layer is reliably provided with an excellent thermal cycle property.

Furthermore, if the thermal spray powder is produced by the method of producing a thermal spray powder according to any one of the above configurations (6) to (9), it is possible to reduce the amount of usage or purchase of a fresh raw-material powder by reusing the first non-adhering particles and the second non-adhering particles, or by reusing irregular particles in addition to the first and second non-adhering particles. As a result, it is possible to reduce costs for producing a high-temperature component.

(14) In some embodiments, in the above configuration (12) or (13), the substrate comprises a component of a combustor for a gas turbine, a rotor blade of a gas turbine, or a stationary vane of a gas turbine.

Components of a combustor for a gas turbine, rotor blades of a gas turbine, and stationary vanes of a gas turbine are exposed to high-temperature combustion gas that flows nearby, and thus need to have an excellent thermal cycle property.

In this regard, with the above configuration (14), since the ceramic layer in the thermal barrier coating has an excellent thermal cycle property, a component of a combustor for a gas turbine, a rotor blade for a gas turbine, or a stationary vane for a gas turbine has an excellent thermal cycle property, as well as a high reliability and a long lifetime.

Furthermore, if the thermal spray powder is produced by the method of producing a thermal spray powder according to any one of the above configurations (6) to (9), it is possible to reduce the amount of usage or purchase of a fresh raw-material powder by reusing the first non-adhering particles and the second non-adhering particles, or by reusing irregular particles in addition to the first and second non-adhering particles. As a result, it is possible to reduce costs for producing a component of a combustor for a gas turbine, a rotor blade of a gas turbine, or a stationary vane of a gas turbine.

(15) A gas turbine according to at least one embodiment of the present invention comprises a high-temperature component according to any one of the above (12) to (14).

The gas turbine having the above configuration (15) includes a high-temperature component with an excellent thermal cycle property, and thus a high reliability and a long lifetime.

Furthermore, if the gas turbine includes a high-temperature component of the above configuration (13) with a thermal spray powder produced by the method of producing a thermal spray powder according to any one of the above configurations (6) to (9), production costs of the high-temperature component are reduced, and it is possible to reduce costs for producing a gas turbine. As a result, it is possible to provide a low-cost gas turbine having a high reliability and a long lifetime.

Advantageous Effects

According to at least one embodiment of the present invention, it is possible to provide a method of producing a thermal spray powder, a manufacture apparatus of a thermal spray powder, a thermal spray powder, a high-temperature component coated with thermal barrier coating, and a gas turbine including the high-temperature component, whereby it is possible to obtain a ceramic layer having an excellent thermal cycle property from a material that contains a mixture of different kinds of rare-earth oxide as additive agents.

DETAILED DESCRIPTION

Embodiments of the present invention will now be described in detail with reference to the accompanying drawings. It is intended, however, that unless particularly specified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
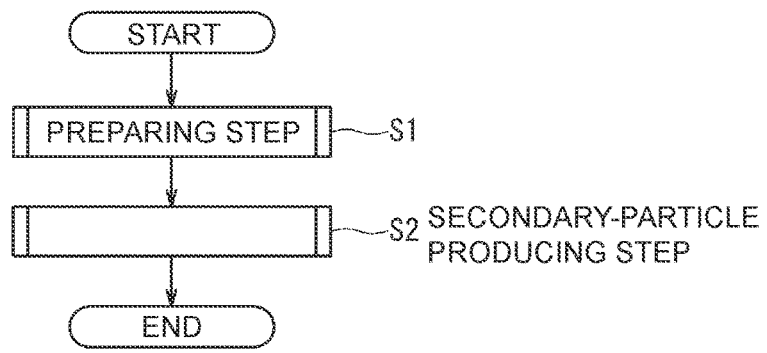
FIG. 1 is a flowchart of a schematic procedure of a method of producing a thermal spray powder according to an embodiment of the present invention.

FIG. 1 is a flowchart of a schematic procedure of a method of producing a thermal spray powder according to an embodiment of the present invention. As depicted in FIG. 1, a method of producing a thermal spray powder includes a preparing step S1 and a secondary-particle producing step S2.

In the preparing step S1, a powder mixture containing the first particles and the second particles is prepared. The powder mixture has a 10% cumulative particle diameter of greater than 0 µm and not greater than 10 µm.

The first particles are made from zirconia-based ceramic containing the first additive agent, and the second particles are made from zirconia-based ceramic containing the second additive agent.

Zirconia-based ceramic containing the first additive agent is a fully or partially stabilized zirconia, containing zirconia ($ZrO_2$) as a main component and the first additive agent as a stabilizer. The first additive agent contains rare-earth oxide, including for instance, at least one kind selected from a group consisting of yttria ($Y_2O_3$), dysprosia ($Dy_2O_3$), ytterbia ($Yb_2O_3$), neodymium (III) oxide ($Nd_2O_3$), samarium (III) oxide ($Sm_2O_3$), europium (III) oxide ($Eu_2O_3$), gadolinium (III) oxide ($Gd_2O_3$), erbium (III) oxide ($Er_2O_3$), and lutetium (III) oxide ($Lu_2O_3$).

Zirconia-based ceramic containing the second additive agent is a fully or partially stabilized zirconia, containing zirconia ($ZrO_2$) as a main component and the second additive agent as a stabilizer. The second additive agent is contains rare-earth oxide, including for instance, at least one kind selected from a group consisting of yttria ($Y_2O_3$), dysprosia ($Dy_2O_3$), ytterbia ($Yb_2O_3$), neodymium (III) oxide ($Nd_2O_3$), samarium (III) oxide ($Sm_2O_3$), europium (III) oxide ($Eu_2O_3$), gadolinium (III) oxide ($Gd_2O_3$), erbium (III) oxide ($Er_2O_3$), and lutetium (III) oxide ($Lu_2O_3$).

The first additive agent and the second additive agent are different from each other.

10% cumulative particle diameter refers to such a particle diameter that 10% by mass of particles falls below the particle diameter, when the particles are cumulated in an ascending-order by diameter in a particle-size distribution obtained by the laser diffraction method. The laser diffraction method can be performed by using a laser diffraction type particle diameter distribution measuring apparatus (e.g. Microtrac MT3000II of Nikkiso co., Ltd).

A particle diameter obtained by the laser diffraction method is based on an assumption that a particle of a powder to be measured has a spherical shape.

In the secondary-particle producing step S2, a plurality of secondary particles including the first particles and the second particles sintered to each other is produced.

The powder containing the plurality of secondary particles obtained in the secondary-particle producing step can be used as a thermal spray powder.

According to the method of producing a thermal spray powder according to the above described embodiment, each of the plurality of first particles and the plurality of second particles prepared has a 10% cumulative particle diameter of more than 0 µm and not more than 10 µm, and thus the first particles and the second particles are finely dispersed in each secondary particle. Thus, in a ceramic layer obtained by spraying a powder containing the secondary particles, it is possible to suppress generation of a large chunk of zirconia-based ceramic containing only one of the first additive agent or the second additive agent. As a result, generation and development of cracks on the boundary of a chunk are suppressed, and thereby it is possible to obtain a ceramic layer having an excellent thermal cycle property.

Herein, a large chunk of zirconia-based ceramic refers to a chunk having a size that promotes generation and development of cracks on the boundary of the chunk. With the configuration of the above described embodiment, it is possible to obtain a ceramic layer completely or substantially free of a chunk of zirconia-based ceramic containing only one of the first additive agent and the second agent and having a size that contributes to generation and development of cracks.

In some embodiments, the first additive agent is yttria (yttrium oxide), and the second additive agent is ytterbia (ytterbium oxide).

A ceramic layer made from zirconia-based ceramic containing ytterbium oxide, i.e., YbSZ, has a better thermal resistant property than a ceramic layer made from YSZ. On the other hand, in a ceramic layer obtained by spraying a powder mixture containing YbSZ particles and YSZ particles, there is a risk of generation of a relatively large chunk of YbSZ, which may lead to generation or development of cracks on the boundary of the chunk.

Figure 2:
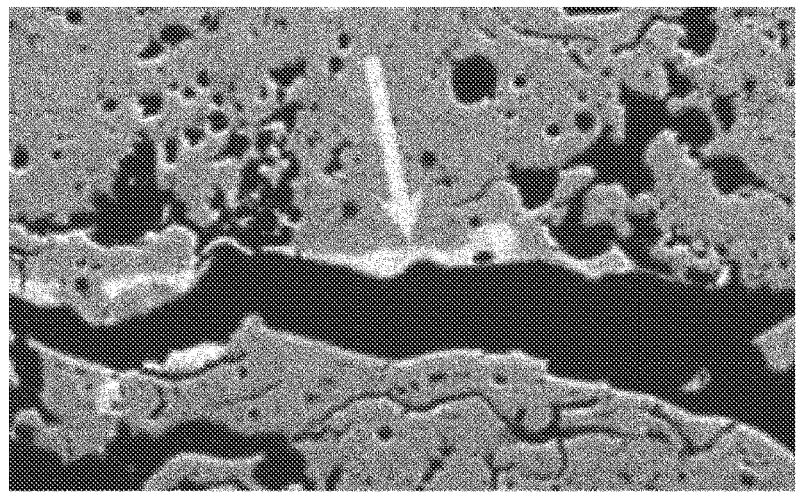
FIG. 2 is an SEM image of a section of a ceramic layer with a crack.

FIG. 2 is an SEM image (secondary electron reflection image) of a section of a ceramic layer in which a crack has been generated. This ceramic layer is obtained by spraying a powder mixture containing YbSZ particles and YSZ particles recovered by a reusing method of Patent Document 5. In FIG. 2, there is a light-colored region along the crack as pointed out by an arrow. The light-colored region represents a portion with a high density of ytterbium, which is heavier than yttrium, showing that cracks are more likely to form or develop on the boundary of a chunk of YbSZ.

Figure 3:
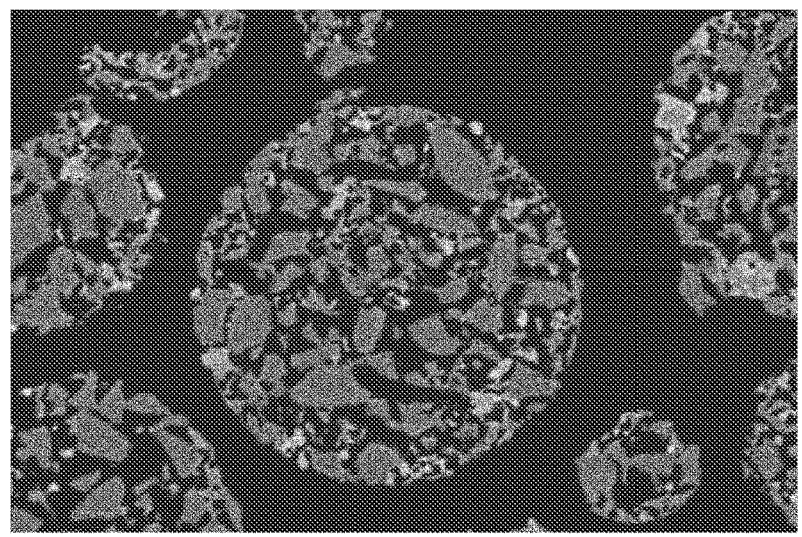
FIG. 3 is an SEM image of a plurality of secondary particles produced by a method of producing a thermal spray powder according to an embodiment.

FIG. 3 is an SEM image of a plurality of secondary particles produced by a method of producing a thermal spray powder according to an embodiment. The second particles each include both of the YbSZ particles and the YSZ particles.

As depicted in FIG. 3, according to a method of producing a thermal spray powder of an embodiment, each secondary particle includes a finely-dispersed mixture of YbSZ particles and YSZ particles. Thus, in a ceramic layer obtained by spraying the secondary particles, it is possible to suppress generation of a large chunk of YbSZ. As a result, generation and development of cracks on the boundary of a chunk are suppressed, and thereby it is possible to obtain a ceramic layer having an excellent thermal cycle property.

In some embodiments, the powder mixture prepared in the preparing step S1 has a 10% cumulative particle diameter of not greater than 5 μm.

With this configuration, each of the plurality of first particles and the plurality of second particles has a 10% cumulative particle diameter of not greater than 5 μm, and thus each secondary particle contains a mixture of the first particles and the second particles in an even more finely-dispersed form. As a result, generation and development of cracks on the boundary of a chunk are suppressed, and thereby it is possible to obtain a ceramic layer having an excellent thermal cycle property.

Figure 4:
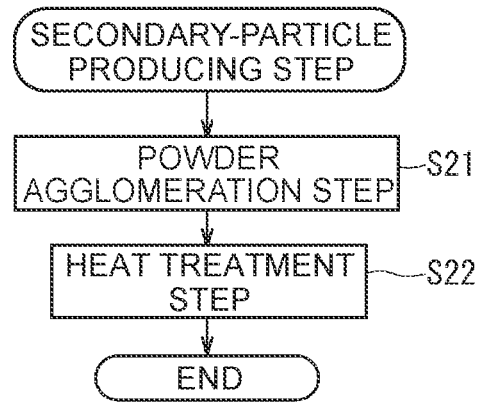
FIG. 4 is a flowchart of a schematic procedure of a secondary-particle producing step according to some embodiments.

FIG. 4 is a flowchart of a schematic procedure of a secondary-particle producing step S2 according to some embodiments. As depicted in FIG. 4, in some embodiments, the secondary-particle producing step S2 includes a powder agglomeration step S21 and a heat treatment step S22.

In the powder agglomeration step S21, the powder mixture prepared in the preparing step S1 is used to produce a plurality of intermediate particles each including the first particles and the second particles by a spray dry method.

In the spray dry method, a slurry is produced, which contains a medium such as water, a powder mixture, a binder, and a dispersing agent if needed. The slurry is obtained by adding a medium, a binder, and a dispersing agent if needed, to a powder mixture, and mixing the same. Then, the obtained slurry is shaped into particles and dried by the spray dry method, and thereby a plurality of intermediate particles is obtained.

For instance, the slurry contains 70 to 90 parts by mass of a powder mixture, 10 to 30 parts by mass of a medium, 0.001 to 1.0 parts by mass of a binder, and if needed, 0.001 to 0.3 parts by mass of a dispersing agent.

As a binder, although not limited to this, a water-based binder or a resin-based binder may be used. For instance, as a binder, polyvinyl alcohol (PVA) may be used.

A dispersing agent is not particularly limited as long as it can disperse the first particles and the second particles. As a dispersing agent, for instance, ammonium polycarboxylate, sodium polycarboxylate, or polyphosphoric acid amino alcohol may be used.

In the heat treatment step S22, the intermediate particles undergo a heat treatment, and the first particles and the second particles are sintered in the intermediate particles. For instance, in the heat treatment step S22, the intermediate particles are heated for a period of at least one hour and at most ten hours, at a temperature of not less than 1300° C. and not more than 1700° C.

With this configuration, intermediate particles can be easily produced by the spray dry method to have a spherical shape, and as a result, it is possible to easily obtain the secondary particles having a spherical shape as depicted in FIG. 3. The secondary particles having a sphere shape can be easily carried, and thus are suitable for thermal spraying.

Furthermore, if the powder mixture has a 10% cumulative particle diameter of not greater than 5 μm, intermediate particles can be easily formed into a sphere shape.

Figure 5:
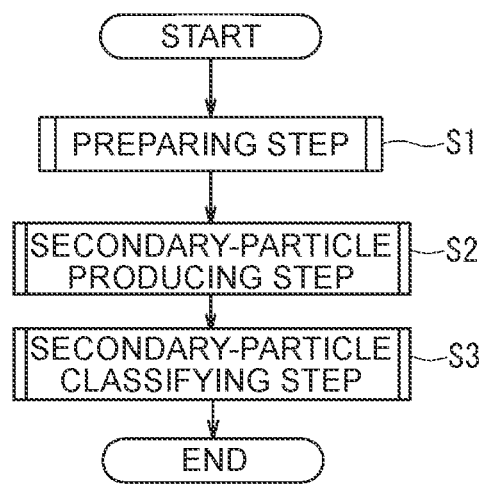
FIG. 5 is a flowchart of a schematic procedure of a method of producing a thermal spray powder according to some aspects.

FIG. 5 is a flowchart of a schematic procedure of a method of producing a thermal spray powder according to some aspects. As depicted in FIG. 5, in some embodiments, the method of manufacturing a thermal spray powder further includes a secondary-particle classifying step S3.

In the secondary-particle classifying step S3, a powder having a 10% cumulative particle diameter of not less than 20 μm and not more than 150 μm is obtained from the secondary particles obtained in the secondary-particle producing step S2.

With this configuration, by thermally spraying a powder of the secondary particles having a 10% cumulative particle diameter of at least 20 μm, it is possible to produce a ceramic layer having a suitable porosity and thus a good thermal barrier property. Also, by thermally spraying a powder having a 10% cumulative particle diameter of not more than 150 μm, an appropriate layer-forming efficiency is achieved, which makes it possible to form a ceramic layer in a relatively short time.

If a powder of the secondary particles has a 10% cumulative particle diameter of at least 30 μm, it is possible to produce a ceramic layer having an even better thermal barrier property.

Figure 6:
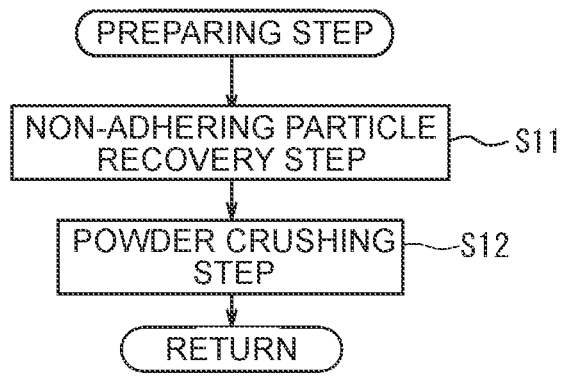
FIG. 6 is a flowchart of a schematic procedure of a preparing step according to some aspects.

FIG. 6 is a flowchart of a schematic procedure of a preparing step S1 according to some aspects. As depicted in FIG. 6, in some embodiments, the preparing step S1 includes a non-adhering particle recovery step S11 and a powder crushing step S12.

In the non-adhering particle recovery step S11, recovered are the plurality of first non-adhering particles that remain unattached to a spray target after spraying a plurality of particles made from zirconia-based ceramic containing the first additive agent, and the plurality of second non-adhering particles that remain unattached to a spray target after spraying a plurality of particles made from zirconia-based ceramic containing the second additive agent.

In the powder crushing step S12, the recovered first non-adhering particles and second non-adhering particles are crushed collectively. As a result of crushing, obtained is a powder mixture of the first particles and the second particles prepared in the preparing step S1.

In this configuration, each of the secondary particles produced from the recovered first non-adhering particles and second non-adhering particles includes a finely-dispersed mixture of zirconia-based ceramic particles containing the first additive agent and zirconia-based ceramic particles containing the second additive agent. Thus, in a ceramic layer obtained by spraying a powder containing the secondary particles, it is possible to suppress generation of a large chunk of zirconia-based ceramic containing the first additive agent or zirconia-based ceramic containing the second additive agent. As a result, generation and development of cracks on the boundary of a chunk are suppressed, and thereby it is possible to obtain a ceramic layer having an excellent thermal cycle property.

Furthermore, the secondary particles are produced from the recovered first non-adhering particles and second non-adhering particles, and thus the above method of producing a thermal spray powder can also be a method of regenerating a thermal spray powder. Thus, with the above configuration, it is possible to reduce the amount of first non-adhering particles and second non-adhering particles to be discarded, to reduce the used amount of a raw-material powder of zirconia-based ceramic required to produce a ceramic layer per unit volume, and to reduce costs for producing a ceramic layer.

Furthermore, in this configuration, the recovered first non-adhering particles and second non-adhering particles are crushed collectively, and thus it is unnecessary to recover the first non-adhering particles and the second non-adhering particles separately. Thus, it is possible to recover the first non-adhering particles and the second non-adhering particles efficiently, which also contributes to reduction of costs for producing a ceramic layer.

If impure substances are mixed into the first non-adhering particles and the second non-adhering particles recovered in the non-adhering particle recovery step S11, the impure substances may be removed with a sifter or the like before the powder crushing step S12.

Figure 7:
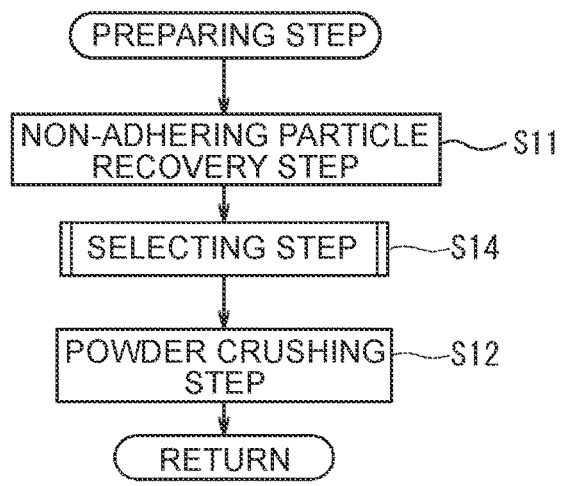
FIG. 7 is a flowchart of a schematic procedure of a preparing step according to some aspects.

FIG. 7 is a flowchart of a schematic procedure of a preparing step S1 according to some aspects. As depicted in FIG. 7, in some embodiments, the preparing step S1 includes a non-adhering particle recovery step S11, a selecting step S14, and a powder crushing step S12.

In the non-adhering particle recovery step S11 in FIG. 7, the plurality of third non-adhering particles that remain unattached to a spray target after spraying a plurality of particles made from metal is recovered along with the plurality of first non-adhering particles and the plurality of second non-adhering particles.

In the selecting step S14, the plurality of first non-adhering particles and the plurality of second non-adhering particles are separated from the plurality of third non-adhering particles recovered in the non-adhering particle recovery step S11.

With this configuration, even in a case where the third non-adhering particles made from metal are collected together with the first and second non-adhering particles, the third non-adhering particles are separated from the plurality of first and second non-adhering particles in the selecting step S14. Thus, it is possible to prevent metal from being included in a product of a thermal spray powder.

Figure 8:
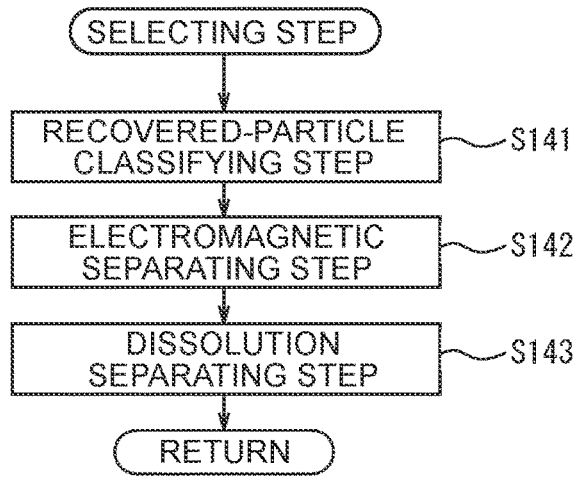
FIG. 8 is a flowchart of a schematic procedure of a selecting step according to some embodiments.

FIG. 8 is a flowchart of a schematic procedure of the selecting step S14 according to some embodiments. As depicted in FIG. 8, in some embodiments, the selecting step S14 includes a recovered particle classifying step S141, an electromagnetic separating step S142, and a dissolution separating step S143.

In the recovered particle classifying step S141, for instance, particles having a 10% cumulative particle diameter of not more than 150 µm is selected from the recovered particles. This is because particles greater than 150 µm are likely to be sand grain or the like.

In the electromagnetic separating step S142, the particles selected in the recovered particle classifying step S141 are electromagnetically separated into a group of the plurality of first non-adhering particles and the plurality of second non-adhering particles, and a group of the third non-adhering particles.

For instance, the selected particles are electrically charged by friction, and the electrically charged particles are separated electro-statically in accordance with the polarity, and thereby the particles can be electromagnetically separated into a group of the plurality of first non-adhering particles and the plurality of second non-adhering particles, and a group of the third non-adhering particles. The above process is based on the tendencies of the first non-adhering particles and the second non-adhering particles made from ceramic to have a negative electric charge, and of the third non-adhering particles made from metal to have a positive electric charge.

In the above electromagnetic separating step S142, the first non-adhering particles and the second non-adhering particles are separated from the third non-adhering particles at a relatively-low accuracy. Thus, the first non-adhering particles and the second non-adhering particles separated in the electromagnetic separating step S142 may still contain the third non-adhering particles.

In the dissolution separating step S143, for instance, the third non-adhering particles made from metal are removed by dissolution by using an acidic aqueous solution such as hydrochloric acid solution, nitric acid solution, and aqua regia, for instance. Accordingly, it is possible to take out the first non-adhering particles and the second non-adhering particles from the recovered particles.

If the recovered powder contains amphoteric hydroxide such as alumina, the amphoteric hydroxide can be removed by dissolution by using alkaline aqueous solution such as sodium hydrate solution.

Figure 9:
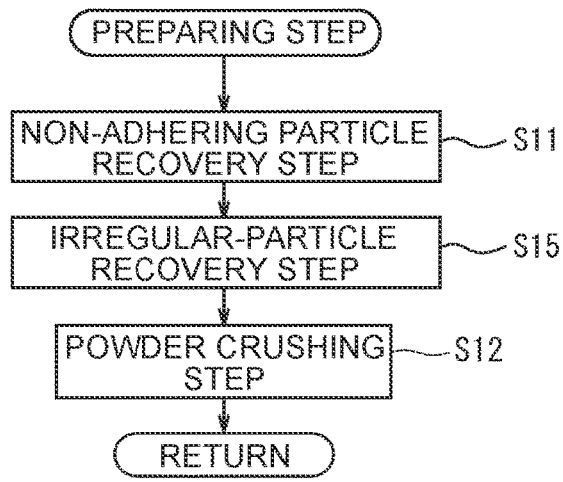
FIG. 9 is a flowchart of a schematic procedure of a preparing step according to some aspects.

FIG. 9 is a flowchart of a schematic procedure of a preparing step S1 according to some aspects. As depicted in FIG. 9, in some embodiments, the preparing step S1 includes a non-adhering particle recovery step S11, an irregular-particle recovery step S15, and a powder crushing step S12.

In the irregular-particle recovery step S15, particles not meeting a standard of particle diameter and being excluded during selection of the secondary-particle classifying step S3 are recovered.

In the powder crushing step S12, the plurality of first non-adhering particles, the plurality of second non-adhering particles, and the irregular particles are crushed collectively.

With this configuration, the irregular particles are collectively crushed along with the plurality of first non-adhering particles and the plurality of second non-adhering particles, and thereby it is possible to make use of the irregular particles, thus resulting in an increase of a regeneration amount of the thermal powder spray. Accordingly, it is possible to further reduce the used amount of a raw-material powder of zirconia-based ceramic required to produce a ceramic layer per unit volume, and to further reduce costs for producing a ceramic layer.

Figure 10:
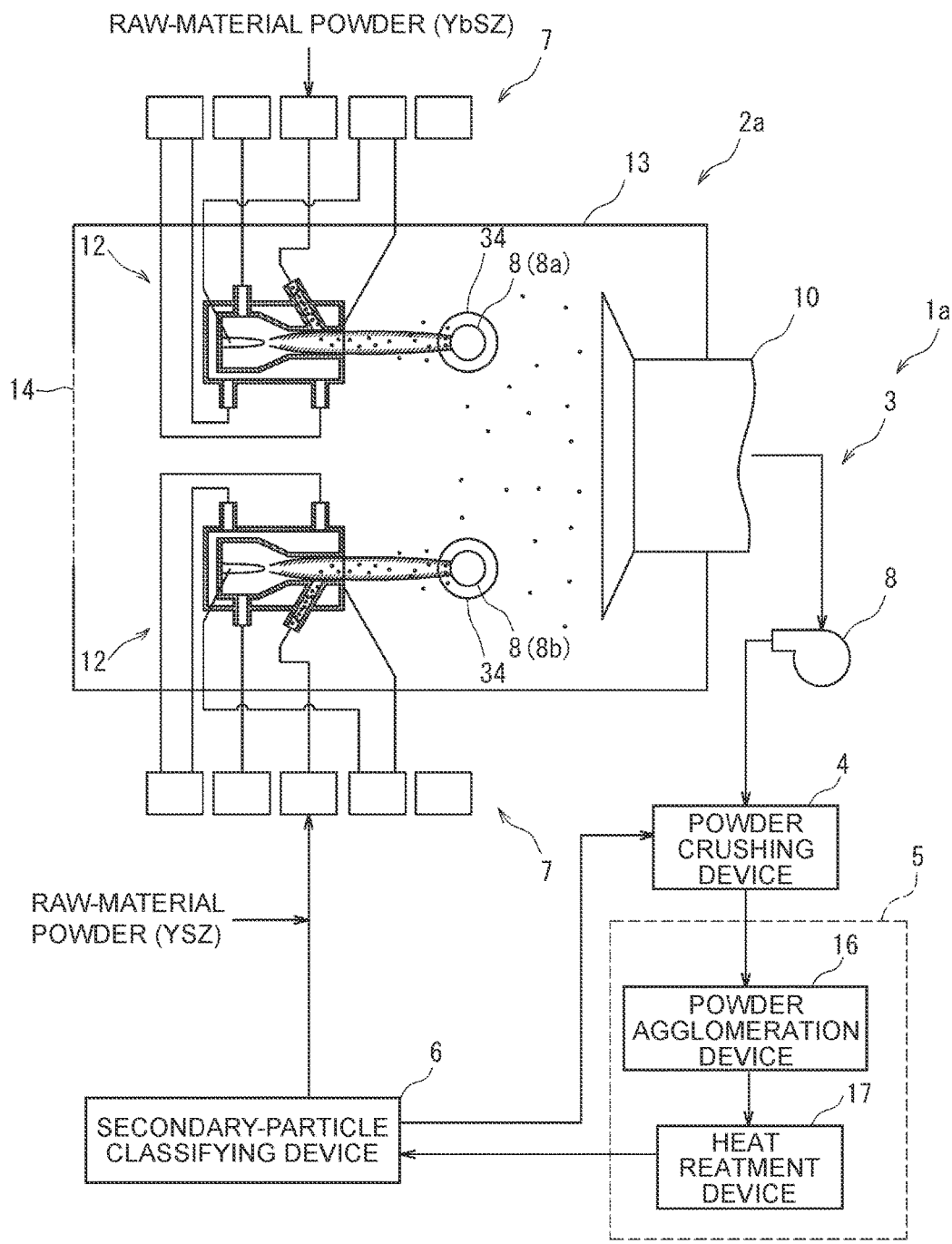
FIG. 10 is a configuration diagram of a thermal spraying facility to which a manufacture apparatus of a thermal spray powder according to at least one embodiment of the present invention is applied.

FIG. 10 is a schematic configuration diagram of a thermal spraying facility 2a to which a manufacture apparatus 1a of a thermal spray powder (hereinafter, also referred to as a powder manufacture apparatus) according to at least one embodiment of the present invention is applied. The powder manufacture apparatus 1a can be used to perform the above described method of producing a thermal spray powder.

As depicted in FIG. 10, the powder manufacture apparatus 1a includes a dust collector 3, a power crushing device (crusher) 4, a secondary-particle producing device 5, and a secondary-particle classifying device 6.

The dust collector 3 is capable of collecting non-adhering particles that remain unattached to a spray target 8, that is, the first non-adhering particles and the second non-adhering particles, from the plurality of particles made from zirconia-based ceramic sprayed from a spraying device 7 of the thermal spraying facility 2a.

For instance, the dust collector 3 includes a collecting duct 10 and an intake fan 11. The collecting duct 10 is formed through a wall of a spraying booth 13 provided with a spraying gun 12 of the spraying device 7 disposed inside, and has an end opening toward the spraying gun 12 with the spray target 8 positioned therebetween. A vent 14 is disposed on a wall of the spraying booth 13 opposite from the collecting duct 10. An intake fan 11 is connected to the other end of the collecting duct 10, and it is possible to recover non-adhering particles through the collecting duct 10 as the intake fan 11 operates.

The power crushing device 4 is capable of crushing non-adhering particles collected by the dust collector 3. As the power crushing device 4, a ball mill or an attritor mill can be used, for instance.

The secondary-particle producing device 5 is capable of producing the secondary particles from a powder of non-adhering particles obtained by the power crushing device 4. For instance, the secondary-particle producing device 5 includes a powder agglomeration device 16 and a heat treatment device 17.

As the powder agglomeration device 16, a spray dry device can be used, for instance. A spray dry device forms intermediate particles including a plurality of particles by solidifying liquid drops of a slurry dropped into hot blast, the slurry including a plurality of crushed particles.

As the heat treatment device 17, an electric furnace can be used, for instance. The heat treatment device 17 heats intermediate particles for a period of at least one hour and at most ten hours, at a temperature not less than 1300° C. and not more than 1700° C. Accordingly, the intermediate particles are sintered, and the secondary particles are produced.

With this configuration, the power crushing device 4 crushes non-adhering particles, and thereby the secondary particles produced from zirconia ceramic particles containing different additive agents contain a mixture of finely-dispersed zirconia-based ceramic particles containing different additive agents. Thus, in a ceramic layer obtained by spraying a powder containing the secondary particles, it is possible to suppress generation of a large chunk of zirconia-based ceramic containing a particular additive agent. As a result, generation and development of cracks on the boundary of a chunk are suppressed, and thereby it is possible to obtain a ceramic layer having an excellent thermal cycle property.

Figure 11:
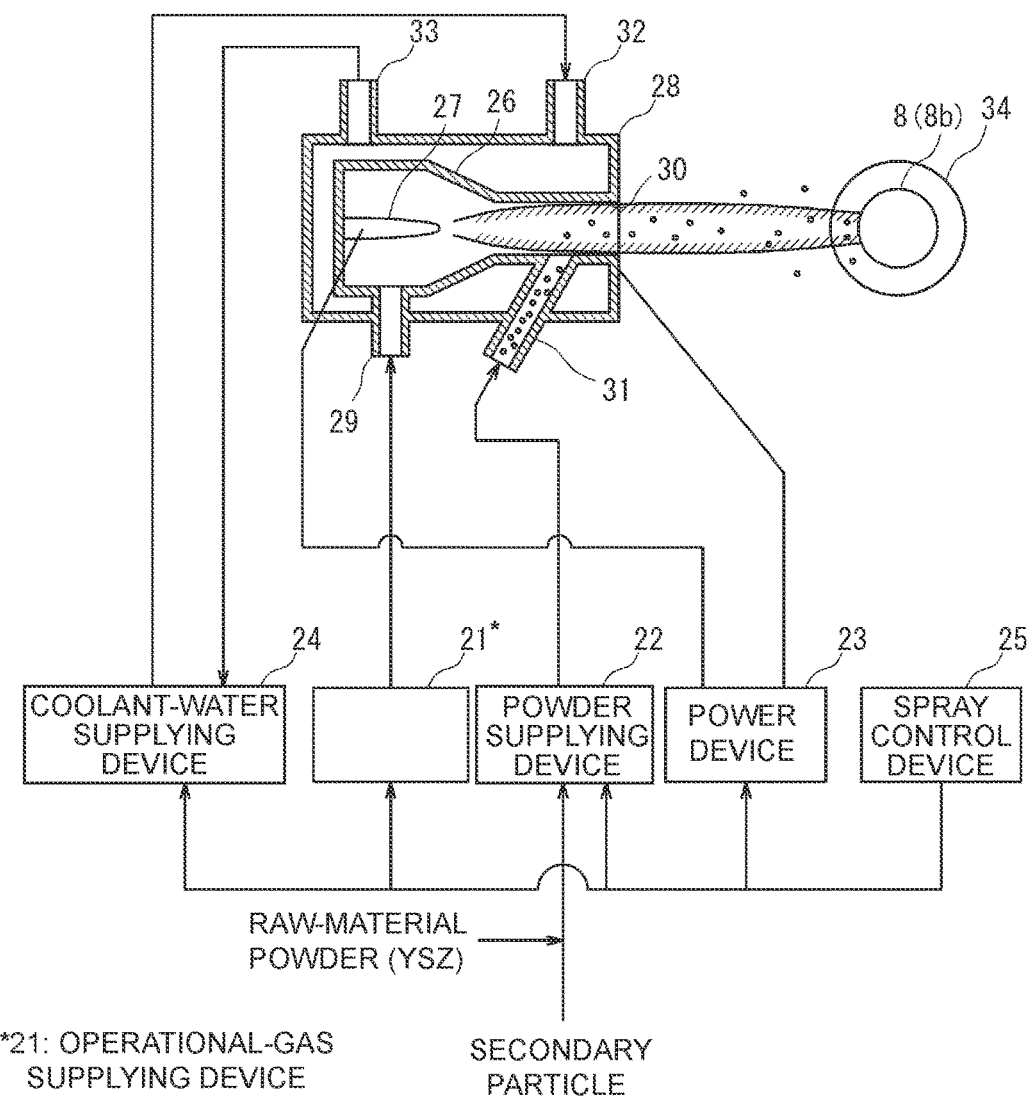
FIG. 11 is a schematic configuration diagram of a spraying device in FIG. 10.

FIG. 11 is a schematic configuration diagram of the spraying device 7 in FIG. 10.

The spraying device 7 is a plasma spraying device. As depicted in FIG. 11, the spraying device 7 includes the spraying gun (plasma spraying gun) 12, an operational-gas supplying device 21 that supplies the spraying gun 12 with operational gas, a powder supplying device 22 that supplies the spraying gun 12 with a powder, a power device 23 that supplies the spraying gun 12 with electric power to generate plasma from the operational gas, a coolant-water supplying device 24 that supplies the spraying 12 with coolant water, and a spray control device 25 that controls the above devices 21 to 24.

The spraying gun 12 includes a nozzle 26 to generate plasma therein, a tungsten electrode 27 disposed inside the nozzle 26, and a gun housing 28 surrounding the nozzle 26. The tungsten electrode 27 is fixed inside the nozzle 26 at a root side of the nozzle 26. The nozzle 26 has an operational gas inlet 29 formed near the root side of the nozzle 26, and a powder inlet 31 formed near an injection aperture 30 of the nozzle 26. Furthermore, the gun housing 28 has a coolant-water inlet 32 through which coolant water flows from the coolant-water supplying device 24 to a coolant space formed between the inside of the gun housing 28 and the outer side of the nozzle 26, and a coolant-water outlet 33 through which coolant water inside the coolant space is to be discharged.

Operational gas such as Ar from the operational-gas supplying device 21 is supplied into the nozzle 26 of the spraying gun 12. Furthermore, as the power device 23 operates, the tungsten electrode 27 becomes a negative electrode and the nozzle 26 near the injection aperture 30 becomes a positive electrode, whereby electrons are emitted toward the nozzle injection aperture 30 from the tungsten electrode 27. Accordingly, the operational gas is ionized and turned into plasma. A thermal spray powder from the powder supplying device 22 is supplied to this plasma. The thermal spray powder is plasma-heated and sprayed to the spray target 8. The spray target 8 is disposed on a turn table 34 disposed inside the thermal spraying booth, for instance, and the spraying direction with respect to the spray target 8 can be changed by rotating the turn table 34.

The powder supplying device 22 may be supplied with a thermal spray powder produced by the powder manufacture apparatus 1a. If the amount of thermal spray powder is not sufficient, a fresh raw-material powder made from zirconia-based ceramic containing an additive agent may be supplied.

For instance, the spraying facility 2a depicted in FIG. 10 includes a plurality of, two for example, spraying devices 7. One of the spraying devices 7 is supplied with a thermal spray powder manufactured by the powder manufacture apparatus 1 and a fresh raw-material powder if needed, while the other one of the spraying devices 7 is supplied with a fresh raw-material powder. One of the spraying devices 7 is supplied with a raw-material powder containing YSZ, for instance, and the other one of the spraying devices 7 is supplied with a raw-material powder containing YbSZ.

With this configuration, a spray target 8b of one of the spraying devices 7 is sprayed with YSZ and YbSZ, while a spray target 8a of the other one of the spraying devices 7 is sprayed with YbSZ.

Figure 12:
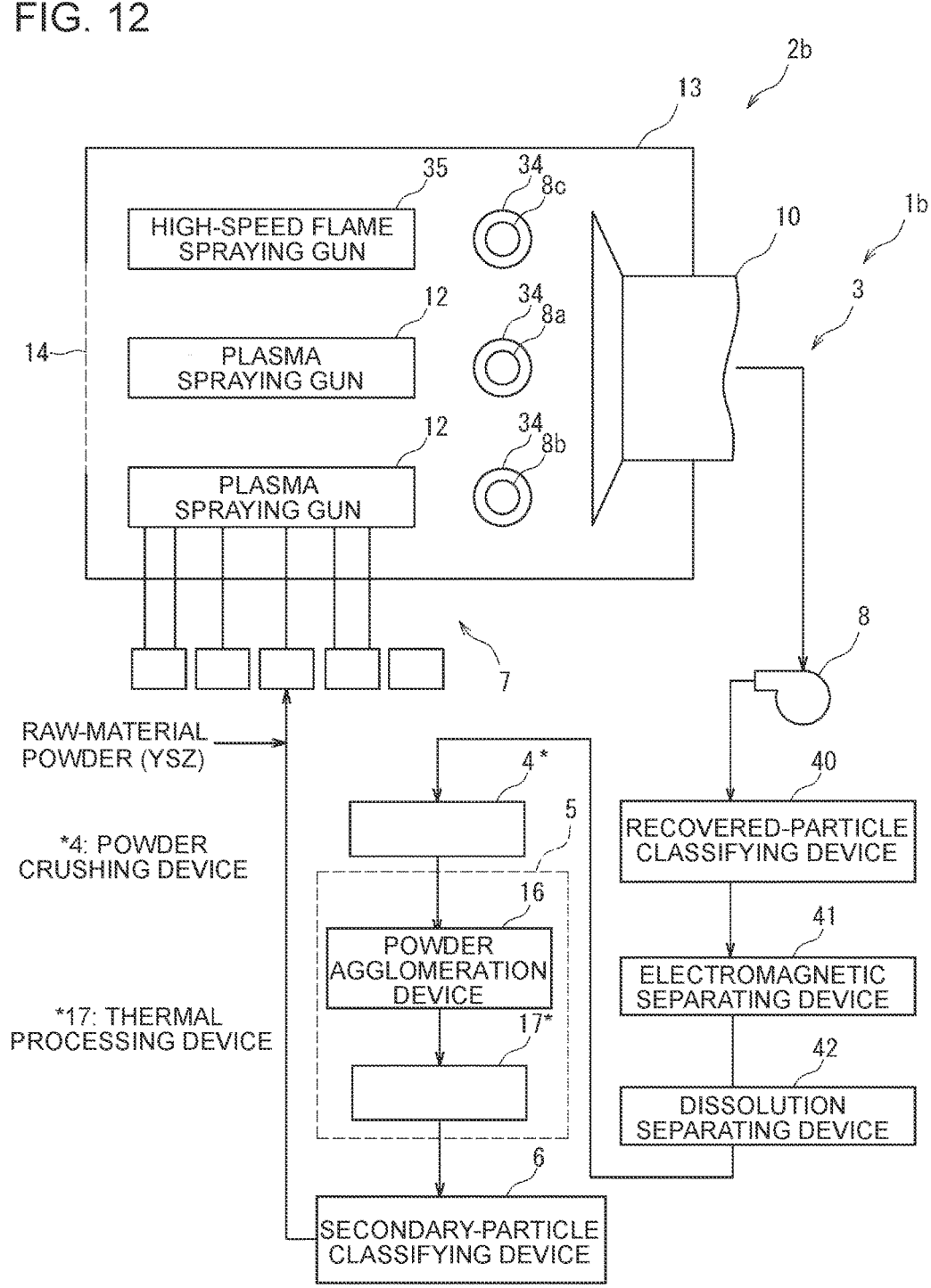
FIG. 12 is a schematic configuration diagram of a thermal spraying facility to which a manufacture apparatus of a thermal spray powder according to some embodiments is applied.

FIG. 12 is a schematic configuration diagram of the thermal spraying facility 2b provided with the manufacture apparatus 1b for producing a thermal spray powder according to some embodiments.

The spraying facility 2b of FIG. 12 further includes a high-speed flame spraying gun 12 that constitutes a spraying device other than the spraying device 7. A high-speed flame spraying gun 35 is used to spray metal onto the spray target 8c.

In the case of the spraying facility 2b in FIG. 12, non-adhering particles (the third non-adhering particles) made from metal that remain unattached to a spray target 8c are collected by the dust collector 3 along with the first non-adhering particles and the second non-adhering particles. Thus, the powder manufacture apparatus 1b further includes a recovered-particle classifying device 40, an electromagnetic separating device 41, and a dissolution separating device 42.

The recovered-particle classifying device 40, for instance, selects particles having a 10% cumulative particle diameter of not more than 150 μm from the recovered particles. This is because particles greater than 150 μm are likely to be sand grain or the like.

The electromagnetic separating device 41 electromagnetically separates the particles selected by the recovered-particle classifying device 40 into a group of the plurality of first non-adhering particles and the plurality of second non-adhering particles, and a group of the third non-adhering particles.

For instance, the electromagnetic separating device 41 includes a friction electric charging device and an electrostatic separating device. The friction electric charging device can electrically charge selected particles by friction. The electrostatic separating device separates the electrically charged particles electro-statically in accordance with the polarity, and thereby the particles can be separated into a group of the plurality of first non-adhering particles and the plurality of second non-adhering particles, and a group of the third non-adhering particles. The above process is based on the tendencies of the first non-adhering particles and the second non-adhering particles made from ceramic to have a negative electric charge, and of the third non-adhering particles made from metal to have a positive electric charge.

The electromagnetic separating device 41 separates the first non-adhering particles and the second non-adhering particles from the third non-adhering particles at a relatively-low accuracy. Thus, the first non-adhering particles and the second non-adhering particles separated by the electromagnetic separating device 41 may contain the third non-adhering particles.

The dissolution separating device 42, for instance, removes the third non-adhering particles made from metal by dissolution by using an acidic aqueous solution such as hydrochloric acid solution, nitric acid solution, or aqua regia. Accordingly, it is possible to take out the first non-adhering particles and the second non-adhering particles from the recovered particles.

If the recovered powder contains amphoteric hydroxide such as alumina, the amphoteric hydroxide can be removed by dissolution by using alkaline aqueous solution such as sodium hydrate solution.

The first non-adhering particles and the second non-adhering particles obtained by the dissolution separating device 42 are cleaned and dried before being supplied to the power crushing device 4.

With the above described manufacture apparatus 1b for producing a thermal spray powder, even in a case where the third non-adhering particles made from metal is collected together with the first non-adhering particles and the second non-adhering particles, the third non-adhering particles are separated from the plurality of first non-adhering particles and the second non-adhering particles by the recovered-particle classifying device 40, the electromagnetic separating device 41, and the dissolution separating device 42, which serve as a selecting device. Thus, it is possible to prevent metal from being included in a product of a thermal spray powder.

As described above, a spraying powder produced by the method of manufacturing a thermal spraying powder or the manufacture apparatus 1a or 1b according to an embodiment of the present invention includes a plurality of secondary particles each containing the first particle and the second particle sintered with each other. The first particle contains zirconia-based ceramic containing the first additive agent, and the second particle contains zirconia-based ceramic containing the second additive agent. Each of the first particle and the second particle has a 10% cumulative particle diameter of more than 0 μm and not more than 10 μm.

While the thermal spray powder includes the secondary particles made from zirconia-based ceramic containing different additive agents, the plurality of first particles and the plurality of second particles each has a 10% cumulative particle diameter of greater than 0 μm and not greater than 10 μm, whereby particles of zirconia-based ceramic containing different additive agents are finely dispersed in the secondary particles. Thus, in a ceramic layer obtained by spraying a powder containing the secondary particles, it is possible to suppress generation of a large chunk of zirconia-based ceramic containing a particular additive agent. As a result, generation and development of cracks on the boundary of a chunk are suppressed, and thereby it is possible to obtain a ceramic layer having an excellent thermal cycle property.

Figure 13:
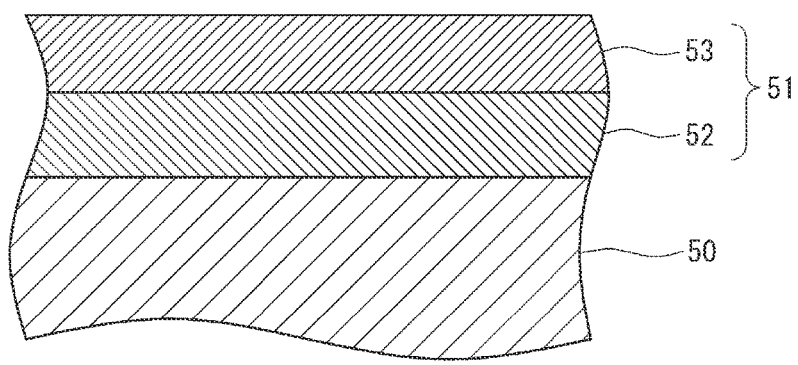
FIG. 13 is a schematic partial cross-sectional view of a component having a substrate and a thermal barrier coating formed on the surface of the substrate.

FIG. 13 is a schematic partial cross-sectional view of a component having a substrate 50 and a thermal barrier coating 51 formed on the surface of the substrate 50.

The substrate 50 is made from, for instance, a thermal resistant alloy such as Ni-based alloy. For instance, Ni-based alloy has a composition Ni-16Cr-8.5Co-1.75Mo-2.6W-1.75Ta-0.9Nb-3.4Ti-3.4Al (% by mass).

The thermal barrier coating 51 includes a metallic bond layer 52 formed on the surface of the substrate 50, and a ceramic layer 53 formed by using a thermal spray powder according to an embodiment of the present invention.

The metallic bond layer 52 is made from, for instance MCrAlY alloy, where M is at least one kind of alloy selected from a group consisting of Ni, Co, and Fe. MCrAlY alloy has a composition Co-32Ni-21Cr-8Al-0.5Y, for example. The thickness of the metallic bond layer 52 is, for instance, at least 10 μm and not more than 500 μm.

The ceramic layer 53 is formed on the surface of the metallic bond layer 52. The ceramic layer 53 is made from zirconia-based ceramic containing additive agents. The thickness of the ceramic layer 53 is, for instance, at least 0.1 mm and not more than 1 mm.

The above described thermal barrier coating 51 can be, for instance, formed by the spraying facility 2b in FIG. 12. Specifically, the high-speed flame spraying gun 35 can form the metallic bond layer 52 on the substrate 50, and the plasma spraying gun 12 can form the ceramic layer 53 on the metallic bond layer 52.

Figure 14:
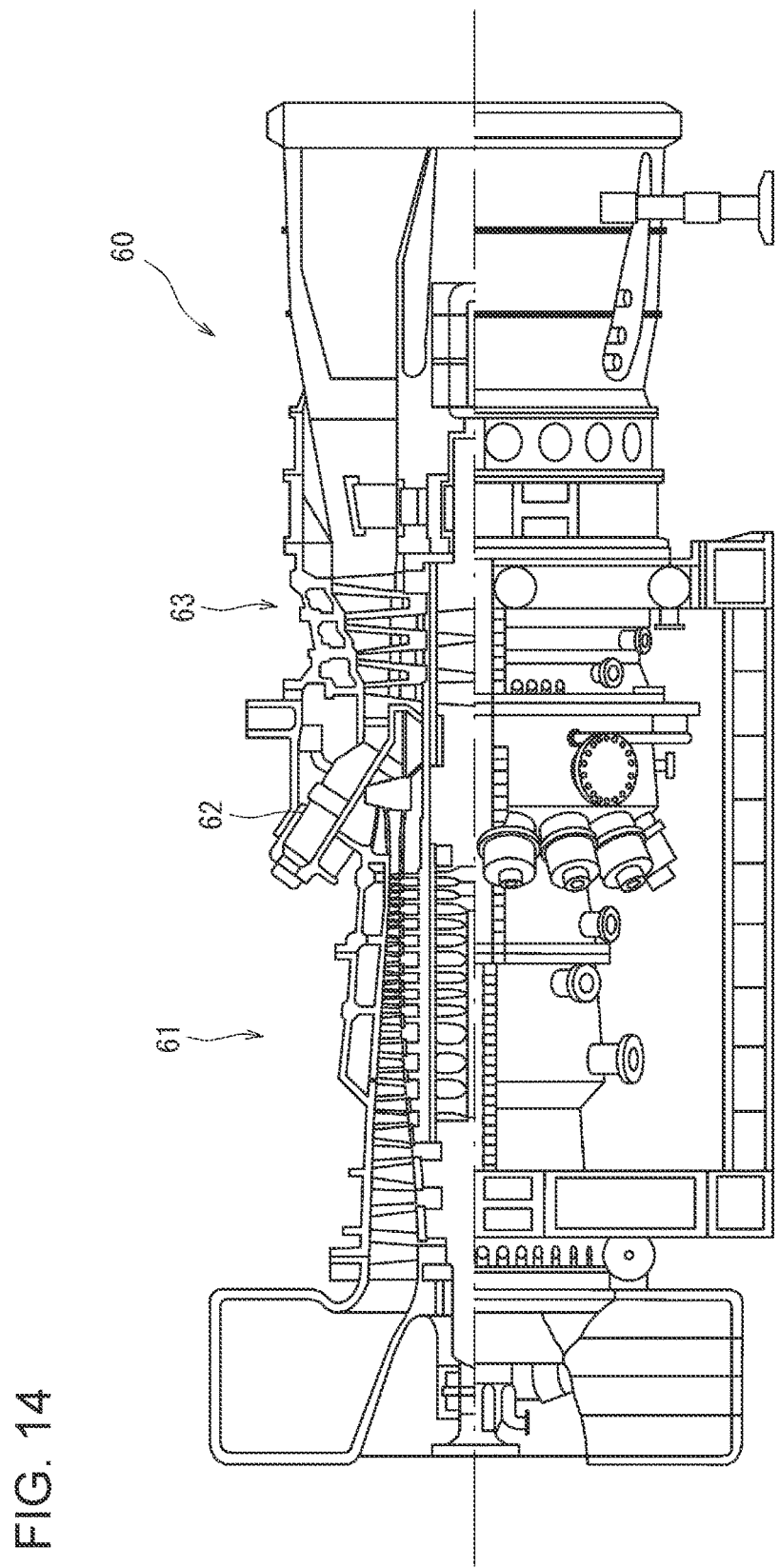
FIG. 14 is a schematic partial cross-sectional view of a gas turbine including a component depicted in FIG. 13.

FIG. 14 is a schematic partial cross-sectional view of a gas turbine 60 including components depicted in FIG. 13.

The gas turbine 60 includes a compressor 61, a combustor 62, and a turbine 63. Air compressed by the compressor 61 is used by the combustor 62 to combust fuel. Combustion gas generated by the combustor 62 drives the turbine 63, and the output of the turbine 63 drives a generator (not depicted) and the compressor 61.

While the gas turbine 60 in FIG. 14 is a gas turbine for power generation, the components depicted in FIG. 13 can also be applied to a gas turbine for an aircraft engine or a ship engine, for instance. The thermal barrier coating 51 can be applied to a variety of high-temperature components such as those of a vehicle engine or the like, besides a gas turbine. Herein, a high-temperature component refers to an object to be exposed to high temperature in general, and not particularly limited. High temperature here means, for instance, at least 500° C. and not more than 2000° C.

Figure 15:
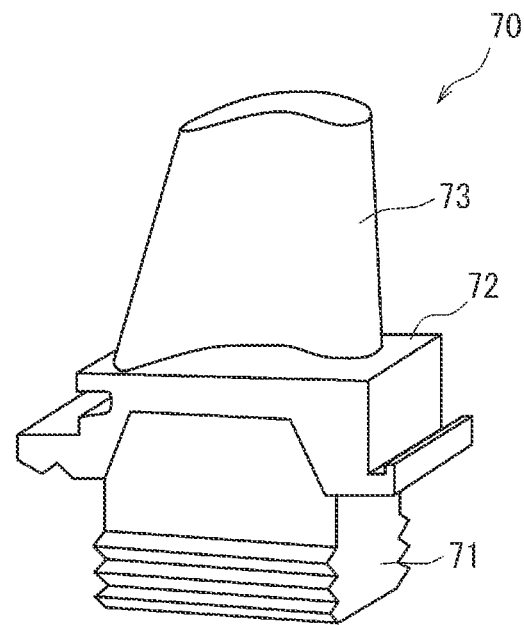
FIG. 15 is a schematic perspective view of a rotor blade to be applied to a turbine.

FIG. 15 is a schematic perspective view of a rotor blade 70 to be applied to a turbine 63. The rotor blade 70 includes a dovetail 71 to be fixed to a disc side, a platform 72, and a blade portion 73. The rotor blade 70 has the thermal barrier coating 51 formed on the surface of the blade portion 73.

Figure 16:
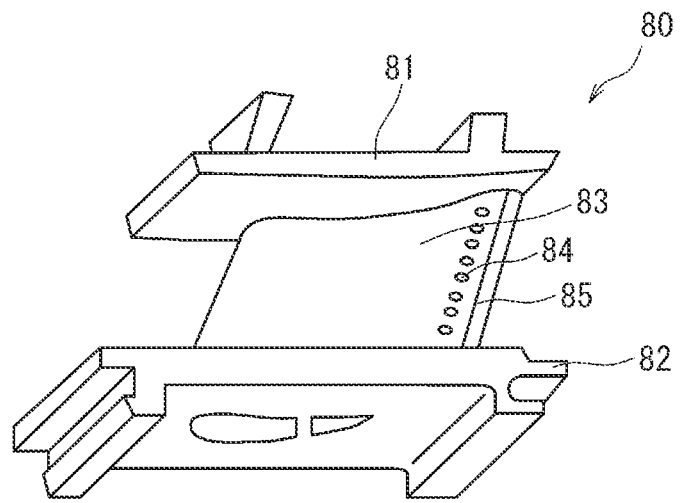
FIG. 16 is a schematic perspective view of a stationary vane to be applied to a turbine.

FIG. 16 is a schematic perspective view of a stationary vane 80 to be applied to the turbine 63. The stationary vane 80 includes an inner shroud 81, an outer shroud 82, and a blade portion 83. A seal-fin cooling hole 84 and a slit 85 are formed on the blade portion 83, for instance. The stationary vane 80 has the thermal barrier coating 51 formed on the surface of the blade portion 83.

Furthermore, in a case of the gas turbine 60, the thermal barrier coating 51 is, for instance, formed on the surface of a combustor basket or a transition piece of the combustor 62.

In the ceramic layer 53 of the thermal barrier coating 51 applied to a component of the gas turbine 60, the ceramic layer 53 is formed by a method of producing a thermal spray powder according to an embodiment of the present invention, or by using a thermal spray powder produced by the manufacture apparatus 1a or 1b according to some embodiments of the present invention, and thereby generation of a large chunk of zirconia-based ceramic containing a particular additive agent is suppressed. As a result, generation and development of cracks on the boundary of a chunk are suppressed, and thereby the ceramic layer 53 obtained has an excellent thermal cycle property, which extends the lifetime of a component covered with the thermal barrier coating 51 including the ceramic layer 53, and of the gas turbine 60 including the component.

Figure 17:
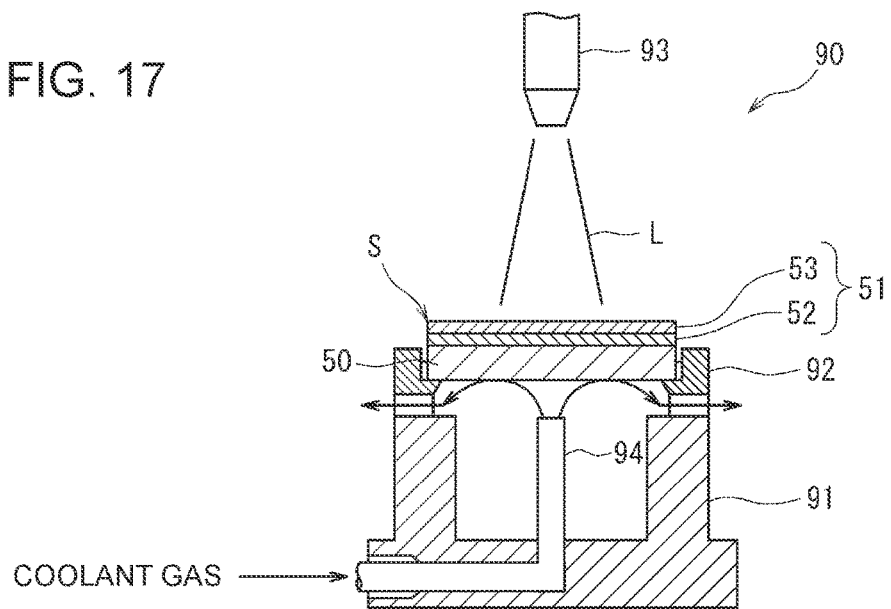
FIG. 17 is a schematic configuration diagram of a laser-type thermal cycle test device for evaluating a thermal cycle property of thermal barrier coating.

FIG. 17 is a schematic configuration diagram of a laser-type thermal cycle test device 90 for evaluating a thermal cycle property of the thermal barrier coating 51.

The laser-type thermal cycle test device 90 includes a main part (base part) 91 and a sample holder 92 disposed on the main part 91. A sample S with the thermal barrier coating 51 formed on the substrate 50 is set on the sample holder 92 so that the thermal barrier coating 51 is on the outer side.

Furthermore, the laser-type thermal cycle test device 90 includes a $CO_2$ laser device 93 and emits laser light L from the laser device 93 toward the sample S, and thereby the sample S is heated from the side of the thermal barrier coating 51. The laser device 93 is, for instance, a $CO_2$ laser device.

Furthermore, the laser-type thermal cycle test device 90 has a coolant-gas nozzle 94 for supplying coolant gas to the back surface of the sample S. Coolant gas discharged from the coolant-gas nozzle 94 cools the back surface of the sample S.

The laser-type thermal cycle test device 90 cools the back surface side of the sample S with coolant gas while the laser device 93 heats the thermal barrier coating 51 side of the sample S, whereby it is possible to generate a temperature gradient readily inside the sample S. Moreover, heating by the $CO_2$ laser device 93 is repeated periodically, and thus it is possible to generate a temperature gradient inside the sample S repetitively.

Figure 18:
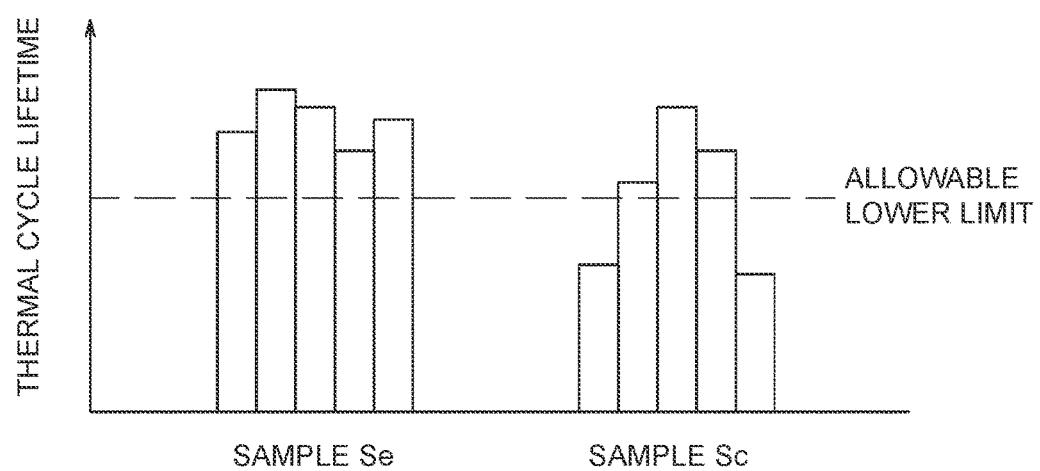
FIG. 18 is a graph showing results of a thermal cycle test of sample Se and sample Sc. Sample Se includes a ceramic layer formed by spraying a thermal spray powder containing YSZ and YbSZ produced by a method of producing a thermal spray powder according to an embodiment of the present invention. Sample Sc includes a ceramic layer formed by spraying a thermal spray powder containing YSZ and YbSZ produced by a method of reusing a thermal spray powder according to Patent Document 5.

By using the above thermal cycle test device 90, two kinds of samples Se and Sc, five samples each, were heated repetitively so that the maximum surface temperature (the maximum temperature of the surface of the thermal barrier coating 51) reaches 1300° C. and the maximum boundary temperature (the maximum temperature of the boundary between the thermal barrier coating 51 and the substrate 50) reaches 950° C. The samples were heated for three minutes and cooled for three minutes in each cycle. FIG. 18 is a chart of a thermal cycle lifetime of each sample, where the number of cycles at which separation occurred on the thermal barrier coating 51 in the thermal cycle test is standardized.

Sample Se includes the ceramic layer 53 formed by spraying a thermal spray powder containing YSZ and YbSZ produced by a method of manufacturing a thermal spray powder according to an embodiment of the present invention. Sample Sc includes the ceramic layer 53 formed by spraying a thermal spray powder containing YSZ and YbSZ produced by a method of reusing a thermal spray powder according to Patent Document 5.

As shown in FIG. 18, in the case of the sample Se, the thermal cycle characteristics of all samples Se were higher than an allowable lower limit. In contrast, in the case of sample Sc, some samples Sc had a thermal cycle characteristic higher than the allowable lower limit, but the others had a thermal cycle characteristic bellow the allowable lower limit.

Accordingly, it can be said that the thermal barrier coating 51 including the ceramic layer 53 formed by spraying a thermal spray powder containing YSZ and YbSZ produced by a method of manufacturing a thermal spray powder according to an embodiment of the present invention has a better thermal cycle characteristic than the thermal barrier coating 51 including the ceramic layer 53 formed by spraying a thermal spray powder containing YSZ and YbSZ produced by a method of reusing a thermal spray powder according to Patent Document 5.

Embodiments of the present invention were described in detail above, but the present invention is not limited thereto, and various amendments and modifications may be implemented.

DESCRIPTION OF REFERENCE NUMERALS

1 Manufacture apparatus of thermal spray powder (powder manufacture apparatus)
2 Thermal spraying facility
3 Dust collector
4 Powder crushing device (crusher)
5 Secondary-particle producing device
6 Secondary-particle classifying device
7 Thermal spraying device
8 Spray target
10 Collecting duct
11 Intake fan
12 Spraying gun
13 Spraying booth
14 Vent
16 Powder agglomeration device
17 Heat treatment device
21 Operational-gas supplying device
22 Powder supplying device
23 Power device
24 Coolant-water supplying device
25 Spray control device
26 Nozzle
27 Tungsten electrode
28 Gun housing
29 Operational gas inlet
30 Nozzle injection aperture
31 Powder inlet
32 Coolant-water inlet
33 Coolant-water outlet
34 Turn table
35 High-speed flame spraying gun
40 Recovered-particle classifying device
41 Electromagnetic separating device
42 Dissolution separating device
50 Substrate
51 Thermal barrier coating
52 Metallic bond layer
53 Ceramic layer
60 Gas turbine
61 Compressor
62 Combustor 63 Turbine
70 Rotor blade
71 Dovetail
72 Platform
73 Blade portion
80 Stationary vane
81 Inner shroud
82 Outer shroud
83 Blade portion
84 Seal-fin cooling hole
85 Slit
90 Laser-type thermal cycle test device
91 Main part (base part)
92 Sample holder 92
93 Laser device
94 Coolant-gas nozzle
S1 Preparing step
S2 Secondary-particle producing step
S3 Secondary-particle classifying step
S11 Non-adhering particle recovery step
S12 Powder crushing step
S14 Selecting step
S15 Irregular-particle recovery step
S21 Powder agglomeration step
S22 Heat treatment step
S141 Recovered-particle classifying step
S142 Electromagnetic separating step
S143 Dissolution separating step

The invention claimed is:

1. A method for producing a thermal spray powder, comprising:
   a preparing step of preparing a powder mixture comprising a first particle made from a zirconia-based ceramic comprising a first additive agent of yttrium oxide and a second particle made from a zirconia-based ceramic comprising a second additive agent of ytterbium oxide, the powder mixture having a 10% cumulative particle diameter of more than 0 µm and not more than 10 µm; and
   a secondary-particle producing step of producing a plurality of secondary particles each of which comprises the first particle and the second particle sintered with each other.

2. A method for producing a thermal spray powder, comprising:
   a preparing step of preparing a powder mixture comprising a first particle made from a zirconia-based ceramic comprising a first additive agent and a second particle made from a zirconia-based ceramic comprising a second additive agent, the powder mixture having a 10% cumulative particle diameter of more than 0 µm and not more than 10 µm;
   a secondary-particle producing step of producing a plurality of secondary particles each of which comprises the first particle and the second particle sintered with each other; and
   a secondary-particle classifying step of obtaining a powder having a 10% cumulative particle diameter of not less than 20 µm and not more than 150 µm from the secondary particles obtained in the secondary-particle producing step.

3. The method for producing a thermal spray powder according to claim 1,
   wherein the powder mixture has a 10% cumulative particle diameter of not more than 5 µm.

4. The method for producing a thermal spray powder according to claim 1,
   wherein the secondary-particle producing step comprises:
   a powder agglomeration step of producing a plurality of intermediate particles each comprising the first particle and the second particle by a spray dry method, and
   a heat treatment step of performing heat treatment on the intermediate particles to obtain the secondary particles.

5. The method for producing a thermal spray powder according to claim 1, further comprising a secondary-particle classifying step of obtaining a powder having a 10% cumulative particle diameter of not less than 20 µm and not more than 150 µm from the secondary particles obtained in the secondary-particle producing step.

6. The method for producing a thermal spray powder according to claim 1, wherein the preparing step further comprises:
   a non-adhering particle recovery step of recovering a plurality of first non-adhering particles which remain unattached to a spray target after spraying a plurality of particles made from the zirconia-based ceramic comprising the first additive agent, and a plurality of second non-adhering particles which remain unattached to a spray target after spraying a plurality of particles made from the zirconia-based ceramic comprising the second additive agent; and
   a powder crushing step of crushing the plurality of first non-adhering particles and the plurality of second non-adhering particles collectively.

7. The method for producing a thermal spray powder according to claim 2,
   wherein the first additive agent is yttrium oxide, and
   wherein the second additive agent is ytterbium oxide.

8. The method for producing a thermal spray powder according to claim 2,
   wherein the powder mixture has a 10% cumulative particle diameter of not more than 5 µm.

9. The method for producing a thermal spray powder according to claim 2,
   wherein the secondary-particle producing step comprises:
   a powder agglomeration step of producing a plurality of intermediate particles each comprising the first particle and the second particle by a spray dry method, and
   a heat treatment step of performing heat treatment on the intermediate particles to obtain the secondary particles.

10. The method for producing a thermal spray powder according to claim 2,
    wherein the preparing step further comprises:
    a non-adhering particle recovery step of recovering a plurality of first non-adhering particles which remain unattached to a spray target after spraying a plurality of particles made from the zirconia-based ceramic comprising the first additive agent, and a plurality of second non-adhering particles which remain unattached to a spray target after spraying a plurality of particles made from the zirconia-based ceramic comprising the second additive agent; and
    a powder crushing step of crushing the plurality of first non-adhering particles and the plurality of second non-adhering particles collectively.

11. A method for producing a thermal spray powder comprising:
    (i) a preparing step comprising:
    preparing a powder mixture comprising a first particle made from a zirconia-based ceramic comprising a first additive agent and a second particle made from a zirconia-based ceramic comprising a second additive agent, the powder mixture having a 10% cumulative particle diameter of more than 0 μm and not more than 10 μm;
- a non-adhering particle recovery step of recovering a plurality of first non-adhering particles which remain unattached to a spray target after spraying a plurality of particles made from the zirconia-based ceramic comprising the first additive agent, and a plurality of second non-adhering particles which remain unattached to a spray target after spraying a plurality of particles made from the zirconia-based ceramic comprising the second additive agent; and
- a powder crushing step of crushing the plurality of first non-adhering particles and the plurality of second non-adhering particles collectively; and
- (ii) a secondary-particle producing step of producing a plurality of secondary particles each of which comprises the first particle and the second particle sintered with each other.

12. The method for producing a thermal spray powder according to claim 11,
   wherein, in the non-adhering particle recovery step, a plurality of third non-adhering particles which remain unattached to a spray target after spraying a plurality of particles made from metal is recovered along with the plurality of first non-adhering particles and the plurality of second non-adhering particles, and
   wherein the method further comprises a selecting step of separating the plurality of third non-adhering particles from the plurality of first non-adhering particles and the second non-adhering particles.

13. The method for producing a thermal spray powder according to claim 11, further comprising:
   a secondary-particle classifying step of obtaining a powder having a 10% cumulative particle diameter of not less than 20 μm and not more than 150 μm from the secondary particles obtained in the secondary-particle producing step,
   wherein the preparing step further comprises an irregular-particle recovery step of recovering irregular particles excluded in the secondary-particle classifying step, and
   wherein, in the powder crushing step, the plurality of first non-adhering particles, the plurality of second non-adhering particles, and the irregular particles are crushed collectively.

14. The method for producing a thermal spray powder according to claim 11,
   wherein, in the non-adhering particle recovery step, the plurality of first non-adhering particles and the plurality of second non-adhering particles are recovered by a dust collector.

15. The method for producing a thermal spray powder according to claim 11,
   wherein the first additive agent is yttrium oxide, and
   wherein the second additive agent is ytterbium oxide.

16. The method for producing a thermal spray powder according to claim 11,
   wherein the powder mixture has a 10% cumulative particle diameter of not more than 5 μm.

17. The method for producing a thermal spray powder according to claim 11,
   wherein the secondary-particle producing step comprises:
   a powder agglomeration step of producing a plurality of intermediate particles each comprising the first particle and the second particle by a spray dry method, and
   a heat treatment step of performing heat treatment on the intermediate particles to obtain the secondary particles.

18. The method for producing a thermal spray powder according to claim 11, further comprising a secondary-particle classifying step of obtaining a powder having a 10% cumulative particle diameter of not less than 20 μm and not more than 150 μm from the secondary particles obtained in the secondary-particle producing step.

* * * * *